Nov. 18, 1947.                N. E. BROOKE                2,431,106
                          GRASS AND WEED CUTTER
                          Filed July 14, 1944
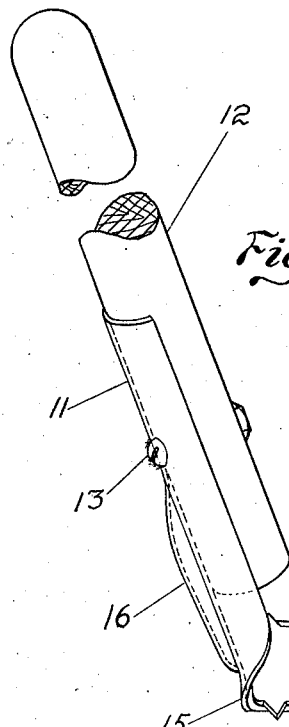
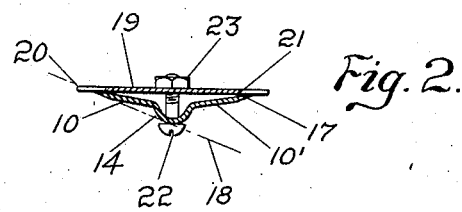
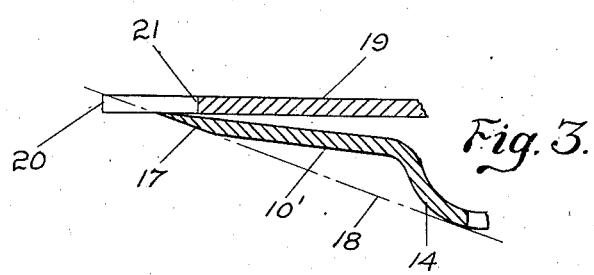
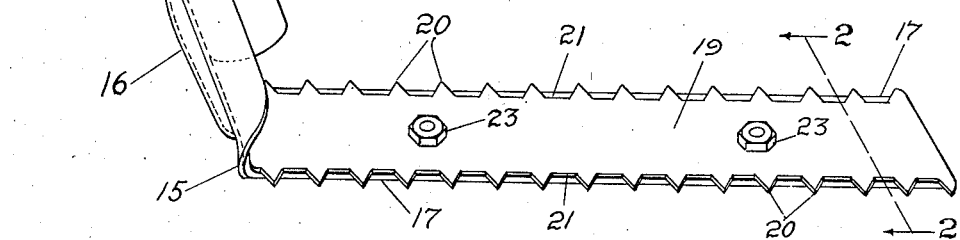
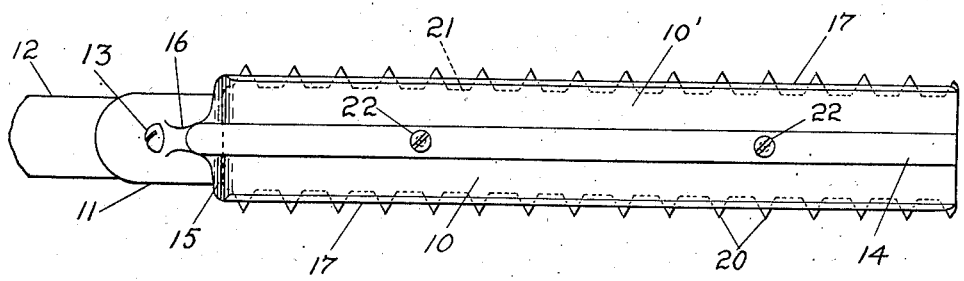
Inventor
Norman E. Brooke.
By Wilfred E. Lawson
                Attorney Patented Nov. 18, 1947

2,431,106

UNITED STATES PATENT OFFICE 2,431,106

GRASS AND WEED CUTTER

Norman E. Brooke, Washington, D. C.

Application July 14, 1944, Serial No. 544,974

4 Claims. (Cl. 30—318)

This invention relates to weed cutting implements and more particularly to implements of the class comprising a head and a handle attached thereto, to be swung in a manner similar to a golf club.

A particular object of the present invention is to provide a grass and weed cutting implement of the above described class, wherein the cutting blade is pressed integrally with a substantially semi-circular shank portion designed to receive an end of a handle, with a reinforcing rib extending lengthwise of the underside of the cutting blade and into the shank to give desired rigidity to the device, the blade being sharpened along its two longitudinal edges and having a toothed plate secured lengthwise of the top thereof to catch grass and weed stalks and facilitate cutting the same by the edge of the blade.

Another object of the invention is to provide in a weed and grass cutter of the character above described, a blade in which the portions lying at the two sides of the longitudinally extending bottom rib are inclined upwardly slightly from the horizontal whereby the toothed plate resting upon the top of the blade is caused to have firm contact with the edges of the blade.

Another object of the invention is to provide in a grass and weed cutter of the character stated, a blade having the upwardly and laterally inclined portions connected with the integral central and depending rib, with the outer edge of each side of the blade sharpened on the underside, the bevel of the sharpened edge being in a plane extending across the underside of the rib whereby the rib serves as a tool guide when sharpening the blade edges.

The invention will be best understood from a consideration of the following detailed description taken in connection with the accompanying drawing forming a part of the specification, with the understanding that the invention is not confined to a strict conformity with the showing of the drawing but may be changed or modified so long as such changes or modifications mark no material departure from the essential features of the invention as expressed in the appended claims.

In the drawing:

Figure 1 is a view in perspective of the implement embodying the present invention.

Figure 2 is a transverse section on the line 2—2 of Figure 1.

Figure 3 is a detail section on an enlarged scale, and comprising a portion of Figure 2.

Figure 4 is a bottom plan view of the same.

Referring now more particularly to the drawing the numeral 10 generally designates the blade of the present implement, with which is integrally formed at one end the substantially semi-circular shank portion 11 which is adapted to receive the lower end of a handle 12.

The blade 10 and shank 11 are formed from a single strip of metal of suitable weight and width and the shank 10 in addition to being shaped to have a substantially semi-circular curvature, is bent to extend upwardly and outwardly at an angle from the adjacent end of the blade, with the concave side of the shank directed toward the free end of the blade. Thus the end of the handle 12 lies in the concave front side of the shank where it may be securely fastened by the use of a single bolt and nut 13.

The material of the blade is shaped or formed to provide the central longitudinally extending rib 14 upon the underside of the blade and this rib is extended around the angle or bend 15 where the shank joins the blade, and part-way up the length of the shank as indicated at 16. This rib has the double function of serving as a bottom guard for the blade to prevent bringing the cutting edge of the blade into too close contact with the earth, and of reenforcing the tool at the bend between the blade and shank so that necessary rigidity will be given to this part and prevent the shank being bent from its set angular relation with the blade.

The formation of the blade with the central reenforcing rib at the underside in effect divides the blade into the two side or wing portions each of which is designated 10' and these wing or side portions 10' are set to slope upwardly slightly from the horizontal as is clearly shown in Figure 2 so that the free longitudinal edges of the portions 10' are slightly above the inner edges of these portions where they merge with the rib 14.

The free outer edges of the portions 10' are sharpened by being beveled off upon the underside as indicated at 17 and the plane of this bevel, which is designated 18, passes across the underside of the rib 14 as shown by the plane line 18. Thus the rib serves the further function of acting as a tool guide so that the blade cutting edges when re-sharpened will always have the same bevel. Also by fitting the blade portion 10' at a slight upward inclination it will be seen that any burr which may be formed along the cutting edge by the sharpening tool, can be readily removed by laying the tool across the top of the blade where it will only contact the longitudinal side edges, thus facilitating the removal or cutting away of the burr by the tool, such as a file or the like.

Disposed upon the top of the blade 10 to extend the length thereof, is a toothed guard plate 19 which serves the double function of protecting the cutting edge of the blade and of guiding grass and weed stalks to the blade and preventing them from slipping lengthwise thereof during the cutting operation.

The plate 19 is flat throughout and has formed along its longitudinal edges, the teeth 20. The distance between the points of the teeth on one side of the plate 19 and those upon the opposite side is greater than the total width of the cutting blade but the distance between the gullets 21 between the teeth on one side of the plate 19 and those upon the opposite side, is less than the overall width of the blade 10 and consequently when the plate 19 is disposed upon the top of the blade 10 as shown in Figure 1, and is properly centered thereon, the edges of the blade will extend beyond the gullets of the teeth adjacent thereto but not beyond the points of the teeth. Thus it will be seen that while the teeth points will prevent any large object from coming into contact with the adjacent edge of the blade, they will receive between them the stalks of grass and weeds and guide such stalks to the cutting edge of the blade and will also prevent tough stalks from slipping lengthwise of the blade edge and escaping uncut.

Due to the manner in which the portions 16 of the blade are inclined it will be seen that the edges only of the blade will contact the guard plate 19 and thus when the guard plate is secured in position by the bolts 22 which are passed through the reenforcing rib 14 and through the guard plate to receive the nuts 23, some slight reflexing of the portions 10' of the blade will result as the nuts are drawn up to tighten the plate against the blade so that positive contact between the cutting edge of the blade and the plate 19 throughout the length of the blade edge, is assured.

It will be seen from the foregoing that the cutter of the present application is of a design which may be easily and economically produced and at the same time the construction and arrangement of the parts is such as to assure the maximum cutting effect and the maintenance at all times of a close firm contact between the edge of the blade and the root portions of the teeth 20 so that grass or other material cannot become lodged between the blade and the teeth.

I claim:

1. A cutting implement of the character stated, comprising a relatively long blade body having a shank formed integrally with one end and shaped to receive a handle, said blade body having a cross-sectional form in which the longitudinal edges are at a slight elevation above the longitudinal center of the blade body, such edges being sharpened, a relatively long plate having teeth formed along each longitudinal edge and disposed longitudinally of the blade with the said edges of the blade extending across and contacting the teeth between the points and the gullets thereof, and means connecting the blade body and the plate together.

2. A cutting implement as set forth in claim 1, in which the blade body has pressed therefrom on the longitudinal center thereof a downwardly extending rib, the said rib being continued into the said shank.

3. A cutting implement as set forth in claim 1, in which the blade body and shank are formed of sheet material and in which the blade body has pressed therefrom a downwardly projecting rib extending throughout the length of the blade body and into the said shank, the longitudinal edges of the blade body being sharpened with a single bevel formd upon the underside of the edge and in a plane extending across the underside of and tangential to the rib.

4. A cutting implement of the character stated, comprising a relatively long cutting blade and a handle receiving shank forming an integral angular extension of one end, said shank being substantially semi-circular in cross-section to receive an end of a handle, said blade body having a downwardly pressed rib formed throughout its longitudinal center, the rib extending into and through a portion of the length of the shank, the portions of the blade body at the sides of the rib being inclined upwardly whereby the free edges of said portions lie in a plane slightly above the inner edges thereof, a plate lying upon and extending throughout the length of the blade body, said plate having teeth along its longitudinal edges and extending beyond the adjacent edges of the blade body, said edges of the blade body being sharpened, and means coupling the blade body and the plate together.

NORMAN E. BROOKE.

REFERENCES CITED

The following references are of record in the file of this patent:

UNITED STATES PATENTS

| Number | Name | Date |
|---|---|---|
| 612,002 | Jenkins | Oct. 4, 1898 |
| 1,881,604 | Hull | Oct. 11, 1932 |
| 2,070,041 | Coe | Feb. 9, 1937 |
| 2,336,901 | Thompson | Dec. 14, 1943 |